Patented Dec. 25, 1945

2,391,481

UNITED STATES PATENT OFFICE 2,391,481

CONVERSION OF HYDROCARBONS

Robert F. Ruthruff, Chicago, Ill., assignor, by direct and mesne assignments, of one-half to The M. W. Kellogg Company, Jersey City, N. J., a corporation of Delaware, and one-half to Process Management Company, Inc., Wilmington, Del., a corporation of Delaware No Drawing. Application November 21, 1939,
Serial No. 305,472

5 Claims. (Cl. 196—52)

The present invention relates to the conversion of hydrocarbons, and particularly to the conversion of high boiling hydrocarbons to low boiling hydrocarbons by catalysis. More particularly, the invention is directed to the conversion of high boiling hydrocarbon fractions such as reduced crudes, gas oils and the like to low boiling fractions within the gasoline or motor fuel boiling range by vaporizing the high boiling hydrocarbons and passing the vapors at an elevated temperature suitable for cracking in contact with a synthetically prepared complex mixture, or compound, of silica and alumina.

One of the objects of my invention is the provision of a catalyst for the conversion of high boiling hydrocarbons to low boiling hydrocarbons which may be readily and economically prepared synthetically, and which exhibits a high degree of activity in catalyzing such conversion reactions, particularly the conversion of high boiling hydrocarbons such as reduced crudes and gas oils to motor fuel fractions.

A further object of my invention is the provision of a catalyst for such conversions which may be readily and satisfactorily regenerated by oxidation of the carbonaceous material deposited thereon during the conversion.

Various other objects and features of my invention will be apparent as the description thereof proceeds.

The synthetic silica-alumina complexes employed pursuant to my invention differ radically in physical structure and chemical composition from natural-occurring or acid-treated absorbent clays such as "Super Filtrol" which have been heretofore proposed for use in the catalytic cracking of hydrocarbons. While the exact physical and chemical composition of the synthetic silica-alumina complexes employed is not fully understood and accordingly may best be described by reference to their method of preparation, they, in general, comprise silica gel associated or "activated" with alumina in an amount sufficient to impart a high degree of catalytic activity in the conversion of high boiling hydrocarbons to motor fuel fractons as compared with the catalytic activity for such reactions of either silica gel or alumina alone.

In the practice of my invention, the high boiling hydrocarbons undergoing treatment are vaporized, and the vapors passed in contact with the catalyst for a time and at a temperature sufficient to effect the required conversion.

In my copending application Serial Number 305,473, filed November 21, 1939, I have described and claimed processes for the conversion of high boiling hydrocarbons to low boiling hydrocarbons employing a synthetic alumina-activated silica gel catalyst produced by the activation of a previously prepared silica gel by the addition of or adsorption of alumina thereon. The present invention, in its preferred aspects, is directed particularly to such hydrocarbon conversion processes employing catalysts prepared by procedures involving the co-precipitation of silica and alumina under specified conditions.

I have ascertained that the catalytic activity of catalysts comprising co-precipitated alumina and silica in the conversion of high boilng hydrocarbons to low boling hydrocarbons is largely dependent upon the maintenance of certain ascertained conditions during their preparation, and that catalysts of such a small degree of activity that they are of no practical interest, or a catalyst exhibiting an exceptionally high degree of activity may be prepared dependent upon the observance of the ascertained conditions. The various features of my invention both in its broad and preferred aspects will be evident from a consideration of specific examples of catalyst preparations and their use in the catalytic conversion of high boiling hydrocarbons as exemplified by a specific charging stock, given in the following:

Example 1

A. *Silica component.*—This was derived from a solution prepared by the addition of 315 cc. of water to 250 cc. of the sodium silicate solution having a density of 1.413 and a $SiO_2$ content of 30%.

B. *Alumina component.*—This was derived from a solution prepared by the addition of 55 grams of aluminum nitrate ($Al(NO_3)_3.9H_2O$) to 500 cc. of water.

Solution A was heated to 50° C. and added rapidly to solution B with stirring. The resulting mixture was filtered and then washed by stirring with water and refiltering. The washing and filtering treatment was repeated five times. The washed catalyst was then dried in a drying oven at a temperature of about 212° F.

In the foregoing, the sodium silicate and aluminum nitrate were mixed in quantities corresponding to a molar ratio of silica to alumina of approximately 23 to 1.

Example 2

A. *Silica component.*—This was derived from a solution prepared by the addition of 315 cc. of water, to 250 cc. of sodium silicate having a specific gravity of 1.413 and a $SiO_2$ content of 30%.

B. *Alumina component.*—This was derived from a solution prepared by the addition of 500 cc. of water to 110 grams of aluminum nitrate ($Al(NO_3)_3.9H_2O$). Solution A was heated to 50° C., stirred and added to solution B at once. The gel immediately formed was allowed to stand over night and filtered and washed the same as described in the preceding example.

In this example the sodium silicate and aluminum nitrate were mixed in quantities corresponding to a molar ratio of silica to alumina of 12 to 1.

Example 3

This catalyst was prepared exactly like that in Example 2 above, except that the aluminum nitrate solution was prepared by dissolving 220 grams of aluminum nitrate $(Al(NO_3)_3.9H_2O)$ in 500 cc. of water.

In this example the sodium silicate and aluminum nitrate were mixed in quantities corresponding to a molar ratio of silica to alumina of approximately 6 to 1.

Example 4

This catalyst was prepared exactly the same as that in Example 1 above, except that the aluminum nitrate solution was prepared by the addition of 500 cc. of water to 313 grams of aluminum nitrate $(Al(NO_3)_3.9H_2O)$.

In this example, the sodium silicate and aluminum nitrate were mixed in quantities corresponding to a molar ratio of silica to alumina of approximately 4 to 1.

Example 5

In accordance with this procedure, an ester of silicic acid such as ethyl-orthosilicate is first partially hydrolyzed, following which an aqueous solution of an aluminum salt is added, hydrolysis then being allowed to proceed to completion.

A solution was made by mixing together 750 cc. of ethyl-orthosilicate, 437.5 cc. of ethyl alcohol and 14 cc. of water. After standing 24 hours, a solution made by dissolving 208 grams of aluminum nitrate $(Al(NO_3)_3.9H_2O)$ in 127.5 cc. of water, was added slowly with stirring. The reaction mixture was evaporated to apparent dryness at 125° F., and was then dried further at 220° F.

Example 6

A solution was made by mixing 750 cc. of ethyl-orthosilicate with 437.5 cc. of ethyl alcohol and 14 cc. of a solution containing 22.2 grams of aluminum sulfate $(Al_2(SO_4)_3.18H_2O)$ per liter. After standing 24 hours, 127.5 cc. more of the aluminum sulfate solution were added and the whole was evaporated to apparent dryness at 125° F., following which the catalyst was further dried at 220° F.

Catalysts prepared in accordance with the above examples were employed pursuant to the invention for the conversion of high boiling hydrocarbons to low boiling hydrocarbons as exemplified by the conversion of a Mid-Continent gas-oil to gasoline, the charging stock and other conditions being substantially similar and on a comparable basis.

The charging stock employed in these runs was a Mid-Continent crude gas oil having an A. P. I. gravity of 35.4, an initial boiling point of 482° F. and an end point of 748° F. The charge was vaporized by heating to about 850° F. and then passed over the catalyst at a rate of 100 cc. of oil per hour per 240 cc. of catalyst. Liquid products were collected over each two-hour period, and a representative gas sample collected over a considerable portion of each period. Liquid products were subjected to A. S. T. M. distillation, and the gas sample analyzed by low temperature fractionation. In order to have the results on a comparable basis, the properties of the liquid products were calculated, assuming that all butanes and higher boiling constituents of the gases were incorporated in the liquid products.

The relative efficiency, for the production of gasoline, of catalysts prepared in accordance with Examples 1–4, inclusive, and their composition as shown by analysis, is shown by appended Table 1.

The run in which an alumina-activated catalyst prepared in accordance with Example 5 was employed, showed a gasoline production of 32.7% for the first two-hour period of the run, and then a drop in efficiency to a fairly constant value of about 7–8% over the remaining eight-hour period of the run.

The run in which an alumina-activated catalyst prepared in accordance with Example 6 was employed, showed a low rate of gasoline production varying from 2.5 to 1.4% over the entire run of eight hours. The low rate of catalytic activity in this particular instance was due to the insufficient quantity of aluminum salt employed in the activation treatment, this quantity being much less than that employed in Example 5.

The variations in activity of catalysts prepared in accordance with Examples 1–4, inclusive, are attributed to differences in composition and structure of the final catalyst arising out of the amount of aluminum nitrate employed and the extent of removal of sodium compounds. In the more active catalyst preparations numbered 3 and 4, aluminum nitrate was employed in an amount sufficient to provide a quantity of acid by hydrolysis in excess of that required to neutralize the sodium silicate with a resultant formation of the gel in an acid medium.

Although the amount of aluminum nitrate employed in the preparation of catalyst No. 3 was 66% that employed for catalyst No. 4, it is to be noted that the composition and activity of these two catalysts are substantially the same. In the case of catalyst No. 4, the aluminum nitrate in excess of that employed in the preparation of No. 3 self-evidently stayed in solution and was removed in the wash water, thereby serving no useful purpose. Accordingly in the preparation of catalysts in accordance with my invention, the aluminum salt is preferably added in an amount sufficient to neutralize the alkalinity of sodium silicate but below that amount at which further addition of the aluminum salt causes no increase in the alumina content of the product. A further feature of the preferred method of preparation is the substantially complete removal of solubles, particularly sodium compounds by thorough washing of the catalyst. The complete removal of sodium compounds is apparently facilitated by the preparation of the catalyst in an acid medium as in the case of catalysts Nos. 3 and 4.

It is evident from a consideration of catalysts Nos. 1–4, inclusive, that it is possible to incorporate only a certain maximum amount of alumina in the synthetic catalysts prepared in accordance with these examples. Experiments have shown that this maximum quantity is controlled by the amount of sodium oxide present in the original sodium silicate used. Less than this maximum amount of alumina can be obtained in conjunction with an active catalyst by a variety of methods. For example, catalysts prepared in accord with the teachings of catalyst 1 or catalyst 2 may, after precipitation, be soaked in or washed with dilute acid in order to convert unreacted sodium silicate into silicic acid with the elimination of sodium as a salt of the acid employed, following which any residual solubles are removed by a water wash. Or, as a substitute for this method, sodium silicates of differing sodium oxide silica ratios may be used. When these are treated with sufficient aluminum salt to give a neutral or slightly acid final reaction mixture, precipitates of variable silica-alumina ratios, in proportion to the silica-sodium oxide ratio of the particular sodium silicate used, are obtained. Or by another modification of my invention, both aluminum salt and an acid is added to the sodium silicate, the total acidity of the two added components being sufficient to neutralize the silicate. By this expedient the quantity of aluminum salt may be reduced to any desired quantity. In general, it has been found desirable to employ a minor and relatively small amount of alumina relative to the silica gel component, i. e. 20% or less.

It will be appreciated that various hydrolyzable aluminum salts other than those specified in the preceding examples may be used in the practice of the invention, as well as other soluble silicates such as potassium silicate.

It is to be understood that the particular charging stock and process conditions given above merely exemplify the application of my invention, and are susceptible of wide variation. My process is particularly well exemplified by the treatment of heavy boiling hydrocarbon fractions such as gas oil to produce motor fuels boiling within the gasoline boiling range. The application of my invention in this connection is characterized by the production of relatively high yields of gasoline, and also a gasoline of relatively high antiknock quality as compared with gasoline made by conventional thermal cracking methods.

What I claim is:

1. A process of converting high boiling hydrocarbons to low boiling hydrocarbons within the gasoline boiling range which comprises vaporizing a gas oil and passing the vapors for a time and at a temperature suitable for the required conversion in contact with a catalyst made by adding a hydrolyzable salt of aluminum and an acid to sodium silicate, the total acidity of the salt and acid being sufficient to neutralize the sodium silicate, and washing the resulting precipitate substantially free of soluble material.

2. A process of converting high boiling hydrocarbons to low boiling hydrocarbons within the gasoline boiling range which comprises vaporizing a gas oil and passing the vapors for a time and at a temperature suitable for the required conversion in contact with a catalyst comprising a precipitated aluminum silicate, substantially free of soluble material, in which the molar ratio of $SiO_2$ to $Al_2O_3$ is approximately 10-12 to 1.

3. A process for converting high boiling hydrocarbons to low boiling hydrocarbons which comprises vaporizing the high boiling hydrocarbons and passing the vapors for a time and at a temperature suitable for the required conversion in contact with a catalyst made by the mixing of aluminum nitrate and a solution of ethyl orthosilicate to effect precipitation of an aluminum silicate.

4. A process for producing a silica-alumina composite which comprises mixing a solution of an organic silicon compound with an aluminum salt solution, co-precipitating silica gel and alumina gel from the mixed solutions, and recovering the resultant composite gel.

5. A process for converting a hydrocarbon oil boiling substantially entirely above the gasoline boiling range to lower boiling gasoline constituents which comprises contacting said high boiling hydrocarbon oil at a temperature suitable for the required conversion with a catalyst comprising a silica-alumina complex, substantially free from soluble material, in which the molar ratio of $SiO_2$ to $Al_2O_3$ is approximately 10-12 to 1.

ROBERT F. RUTHRUFF.

Table 1

| Catalyst No. | Reactants, $SiO_2$ to $Al_2O_3$, mol ratio (approx.) | Analysis of catalyst, percent by weight, water-free basis | | | $SiO_2$ to $Al_2O_3$, mol ratio in catalyst | Percent gasoline, first 2 hours |
|---|---|---|---|---|---|---|
| | | $SiO_2$ | $Al_2O_3$ | $Na_2O$ | | |
| 1 | 23:1 | 84.7 | 6.5 | 8.8 | 22:1 | 3.6 |
| 2 | 12:1 | 85.1 | 13.1 | 4.8 | 12.1:1 | 14.0 |
| 3 | 6:1 | 85.4 | 14.3 | 0.3 | 10.1:1 | 36.0 |
| 4 | 4:1 | 87.0 | 12.9 | 0.1 | 11.4:1 | 37.2 |